(12) United States Patent
Child et al.

(10) Patent No.: US 8,910,912 B2
(45) Date of Patent: Dec. 16, 2014

(54) CONDUCTIVE FLOATING PIPE ASSEMBLY CLIP

(75) Inventors: Tyler Christensen Child, Hillard, OH (US); Jason Anthony Graham, Delware, OH (US); Hajime Igami, Dublin, OH (US); Tetsuhiro Ito, Dublin, OH (US); Brandon Wilbert Ollanketo, Dublin, OH (US); Christopher M. Pangallo, Frankfort, IL (US); Timothy D. Pearson, Palos Hills, IL (US); Scott Jeffrey Volchko, Dublin, OH (US); Chunnan Zhou, Northbrook, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/393,741

(22) PCT Filed: Aug. 31, 2010

(86) PCT No.: PCT/US2010/047317
§ 371 (c)(1),
(2), (4) Date: Mar. 1, 2012

(87) PCT Pub. No.: WO2011/028705
PCT Pub. Date: Mar. 10, 2011

(65) Prior Publication Data
US 2012/0153095 A1 Jun. 21, 2012

Related U.S. Application Data

(60) Provisional application No. 61/239,250, filed on Sep. 2, 2009.

(51) Int. Cl.
F16L 3/08 (2006.01)
F16L 55/035 (2006.01)
F16L 3/223 (2006.01)
F16L 3/237 (2006.01)

(52) U.S. Cl.
CPC ............ F16L 55/035 (2013.01); F16L 3/2235 (2013.01); F16L 3/237 (2013.01)
USPC .......................................... 248/73; 248/68.1

(58) Field of Classification Search
USPC ..................... 248/49, 58, 65, 68.1, 74.1, 74.4
See application file for complete search history.

(56) References Cited

U.S. PATENT DOCUMENTS 2,355,742 A * 8/1944 Morehouse ................. 248/68.1
4,881,705 A 11/1989 Kraus
(Continued)

FOREIGN PATENT DOCUMENTS

DE          3602625 C1    3/1987
DE    202008007632 U1    8/2008
(Continued)

OTHER PUBLICATIONS

ISR for PCT/US2010/047317 dated Dec. 10, 2010.

*Primary Examiner* — Steven Marsh
(74) *Attorney, Agent, or Firm* — Paul F. Donovan

(57) ABSTRACT

An isolating clip for holding tubes, fluid lines and the like is provided with a rigid outer shell and a flexible insert. The insert includes an outer body and a tube seat suspended from the outer body by flexible connectors. Bumpers can be provided in the space between the outer body and tube seat to limit deflection of the tube seat.

20 Claims, 3 Drawing Sheets

(56) References Cited

U.S. PATENT DOCUMENTS

| | | |
|---|---|---|
| 5,170,984 A | 12/1992 | Ruckwardt |
| 5,184,794 A * | 2/1993 | Saito .............................. 248/68.1 |
| 5,257,768 A | 11/1993 | Juenemann et al. |
| 5,316,245 A | 5/1994 | Ruckwardt |
| 5,464,179 A | 11/1995 | Ruckwardt |
| 5,669,590 A * | 9/1997 | Przewodek ................. 248/68.1 |
| 5,947,426 A | 9/1999 | Kraus |
| 6,926,237 B2 | 8/2005 | Shereyk et al. |
| 7,267,307 B2 | 9/2007 | Bauer |
| 7,278,190 B2 | 10/2007 | Fischer et al. |
| 7,658,350 B2 | 2/2010 | Bauer |
| 8,157,223 B2 * | 4/2012 | Stau et al. ................... 248/74.2 |
| 8,286,923 B2 * | 10/2012 | Kobayashi et al. .......... 248/74.2 |
| 2005/0116122 A1 * | 6/2005 | Nakanishi ................... 248/68.1 |
| 2007/0222129 A1 | 9/2007 | Kim |
| 2010/0025272 A1 | 2/2010 | Stau et al. |

FOREIGN PATENT DOCUMENTS

| | | |
|---|---|---|
| EP | 230553 | 8/1987 |
| EP | 0490157 A1 | 6/1992 |
| EP | 1493954 A1 | 1/2005 |
| EP | 02131084 | 9/2009 |
| EP | 2149732 A2 | 2/2010 |
| JP | 07310708 | 11/1995 |
| JP | 11336717 | 12/1999 |
| JP | 2000310359 | 11/2000 |
| JP | 2008286347 | 11/2008 |

* cited by examiner

CONDUCTIVE FLOATING PIPE ASSEMBLY CLIP

CROSS-REFERENCE TO RELATED APPLICATIONS

The present application is national phase of PCT/US2010/047317 filed Aug. 31, 2010, and claims the benefits of U.S. Provisional Application Ser. No. 61/239,250 filed Sep. 2, 2009.

FIELD OF THE INVENTION

The present invention relates generally to clips and fasteners for holding lines, tubes and the like in assemblies. More specifically, the invention relates to clips for holding fuel lines in automobiles.

BACKGROUND OF THE INVENTION

Holding devices, sometimes referred to as "clips," are used for routing items such as flexible tubing, rigid tubes, wires, rods and the like in many different assemblies. Holding devices for this purpose are known to include some type of anchoring fixture for securing the holding device to the object on which it is used and a retainer structure that holds and secures the flexible tubing, rigid tube, wires, rod or other item or thing that is to be held in position relative to the anchoring object.

Holding devices of the type described are used extensively in the automotive industry for routing fuel lines, brake lines, wires and the like. In some of these applications and uses, it is desirable to provide some degree of vibration isolation between the item being held and the object to which the holding device is attached. For example, when routing fuel lines, brake lines and the like in an automobile, the mounting clips are secured to frame members, engine components and the like. Fuel lines can be the source of significant vibration. Conductance of vibration from fuel lines to vehicle frames or bodies is undesirable in that line fuel line vibration can noise in the passenger compartment.

Accordingly, it is desirable and advantageous to provide a clip for holding fuel lines and the like that provides fixed, relative positioning to ensure that the fuel line remains where routed yet suspends the fuel line in a forgiving retainer to protect inhibit the transfer of noise and vibration.

"Poka-yoke" is a term meaning to make fail-safe or mistake-proof. In manufacturing and assembly disciplines, the term poka-yoke has been popularized recently when applied to processes and designs that help an assembler or operator to complete an assigned task in a proper manner, to ensure product quality at the time of assembly. The design or process directs or constrains human actions to a proper manner for completing the tasks, and/or immediately highlights an error so that corrective action can be taken in a timely manner. Poka-yoke designs for related parts in an assembly may enable the part to be assembled in only one way, and/or may provide an appearance indicating to observers that incorrect assembly has been performed.

SUMMARY OF THE INVENTION

A conductive floating pipe assembly clip has a rigid outer structure and a more flexible inner structure for engaging a tube or pipe. The inner structure further includes a tube seat directly contacting the tube or pipe. The tube seat is suspended by discrete flexible connectors from an outer body of the inner structure. Bumpers can be the provided between the outer body and the tube seat to limit deflection of the inner seat.

In one aspect of a form thereof, a clip is provided with a rigid outer clamp connectable to an assembly and an insert held in the clamp, the insert being of softer material than the clamp. The insert includes an outer body, a tube seat spaced from the outer body and at least one discrete flexible connector between the outer body and the tube seat.

In another aspect of a form thereof, a clip is provided with a rigid outer clamp connectable to an assembly and an insert of softer material held in the clamp. The insert includes an outer body and a tube seat suspended from the outer body by a plurality of discrete flexible connectors. The insert and clamp have poka-yoke construction limiting assembly to proper orientation and inhibiting insert dislodgement from the completed assembly.

In a further aspect of a form thereof, an isolating clip is provided with a rigid outer clamp having a first shell and a second shell connectable to one another and an insert of material softer than the rigid outer clamp. The insert is held in the outer clamp and includes a first retainer insert half held in the first shell and a second retainer insert half held in the second shell. The first retainer insert half includes a first outer body connected to the first shell, a tube seat suspended from the first outer body by a plurality of discrete flexible connectors, and at least one bumper spanning some but less than all of the space defined between the first outer body and the tube seat suspended from the first outer body. The second retainer insert half includes a second outer body connected to the second shell, a tube seat suspended from the second outer body by a plurality of discrete flexible connectors, and at least one bumper spanning some but less than all of the space defined between the second outer body and the tube seat suspended from the second outer body.

Other features and advantages of the invention will become apparent to those skilled in the art upon review of the following detailed description, claims and drawings in which like numerals are used to designate like features.

Figure 1:
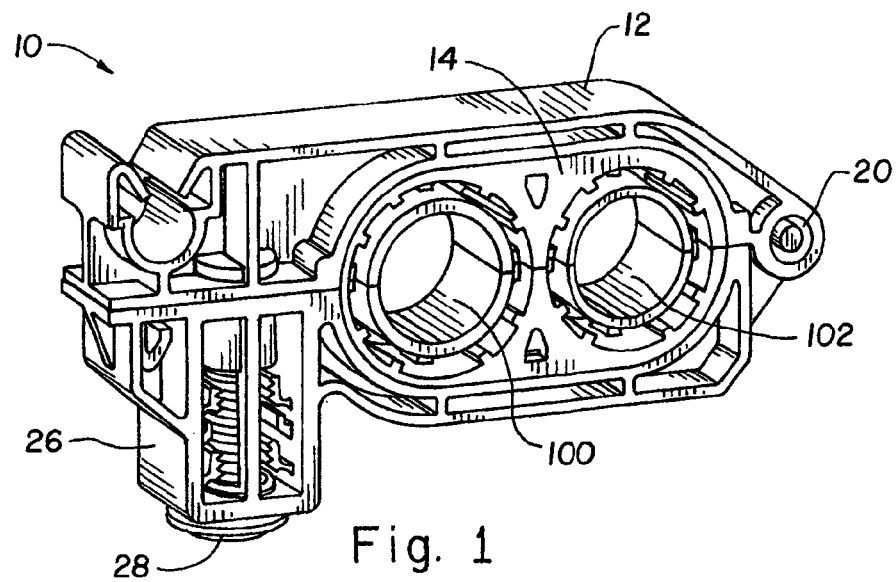
FIG. 1 is a perspective view of a conductive floating pipe assembly clip.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more particularly to the drawings, numeral 10 designates a conductive floating pipe assembly clip suitable for holding a fuel line or other conducting conduit in an automobile. Clip 10 includes a substantially rigid clamp 12 that is connected to the vehicle in some suitable manner, and a softer tube retainer insert 14 held within the clamp, retainer insert 14 being the portion of clip 10 that directly engages the fuel lines. Clamp 12 and retainer insert 14 can be made of conductive plastics to assist in the dissipation of static charges that could otherwise build on the assembly.

Figure 2:
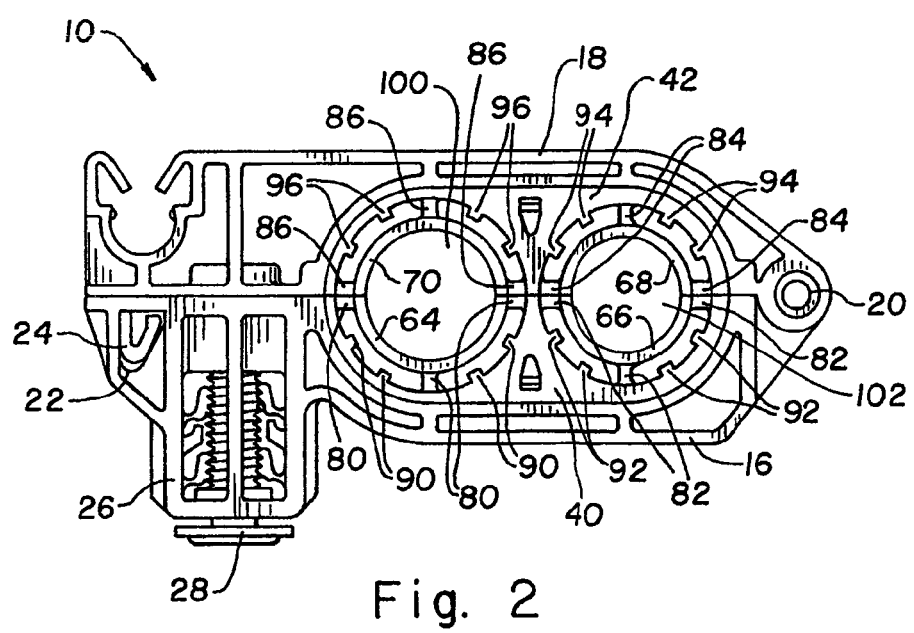
FIG. 2 is a plan view of the clip shown in FIG. 1.
Figure 3:
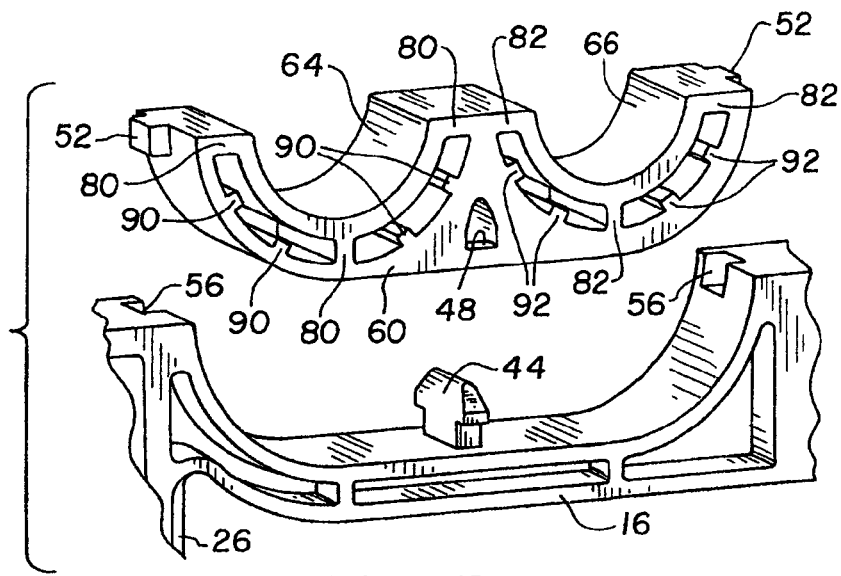
FIG. 3 is an exploded view of a portion of the clip.
Figure 4:
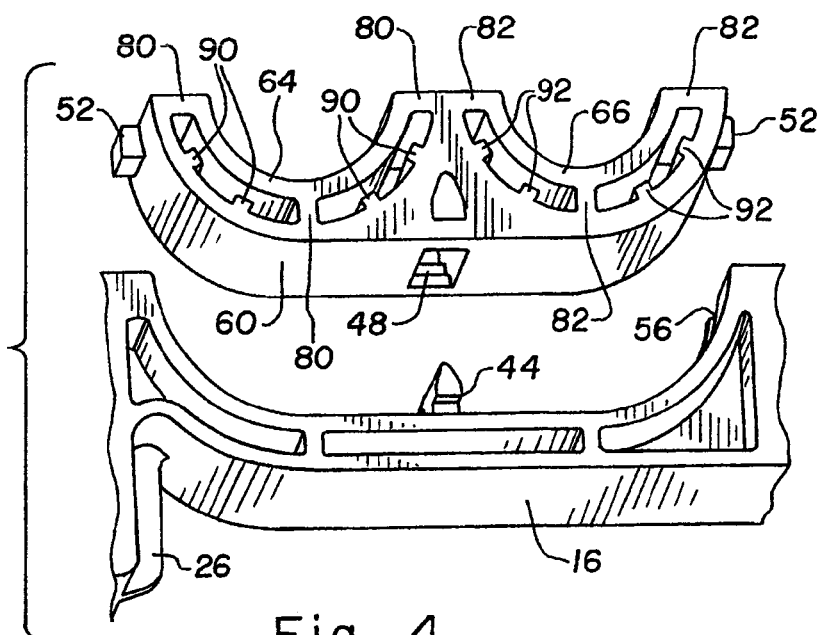
FIG. 4 is an exploded view similar to that of FIG. 3, but taken from a different angle.
Figure 5:
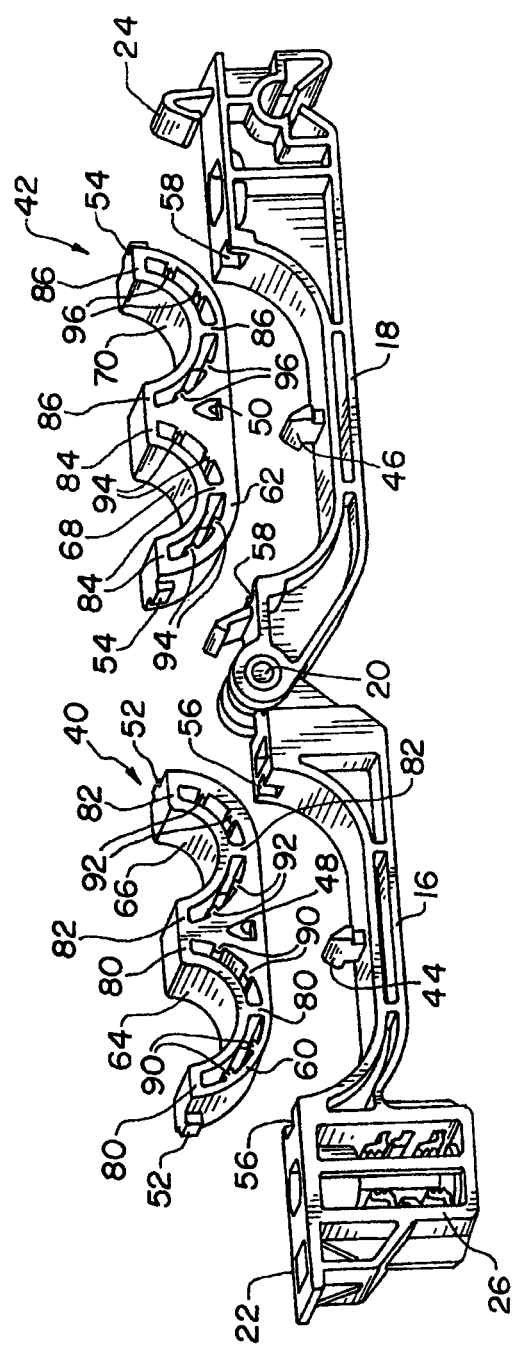
FIG. 5 is an exploded view of the full clip shown in FIGS. 1 and 2

With reference now to FIG. 2, clamp 12, which can be a hard plastic formed by molding, includes a first shell 16 and a second shell 18 pivotally connected about a hinge 20. A female locking feature 22 and a male locking feature 24 are provided on first and second shells 16 and 18, respectively. Shells 16, 18 are pivotal relative to each other about hinge 20 between an opened position for assembly (FIG. 5) and a closed and locked position in which male locking feature 24 is received in and engaged with female locking feature 22 (FIGS. 1 & 2). Clamp 12 is further configured for attachment to anchoring structure in the automobile, and in the exemplary embodiment shown in the drawings includes a stud retention feature 26 for engaging a stud 28 that is anchored to the vehicle. It should be understood that various other types of anchoring structures can be used by which clip 10 is secured in an assembly such as an automobile, or in other assembles.

Retainer insert 14, which can be a softer thermoplastic elastomer, also can be formed by molding. Retainer 14 includes cooperating first and second retainer insert halves 40, 42. First retainer insert half 40 is held in first shell 16 and second retainer insert half 42 is held in second shell 18. Numerous complementary features can be provided on first and second shells 16, 18 and first and second retainer insert halves 40, 42 for properly securing and locating the positions of the retainer insert halves in the shells. For example, posts 44, 46 on shells 16, 18 engage apertures 48, 50 in retainer insert halves 40, 42 in the exemplary embodiment shown. One or several individual protrusions 52, 54 on retainer insert halves 40, 42 are cooperatively received in cutouts 56, 58 along the adjoining surfaces of shells 16, 18. The arrangement and positioning of the various complementary protrusion 52, 54 and cutout 56, 58 features secure first and second retainer insert halves 40, 42 within first and second shells 16, 18 and prevent the unintended dislodgment of the retainer insert halves from the shells if pushed in either direction toward the front or back of the clip relative to the positions of the clip in the various views of the drawings. The arrangement and positioning of the various complementary protrusion 52, 54 and cutout 56, 58 features also promote proper orientation and positioning of the first and second retainer insert halves during assembly by preventing inadvertent improper positioning of the components relative to one another. Protrusions 52, 54 and cutouts 56, 58 allow assembly of retainer insert halves 40, 42 in only the proper orientation within shells 16, 18 and establish abutments against movement of the retainer insert halves within the shells after the shells have been closed and locked in the closed position (so called "poka-yoke" construction).

First and second retainer insert halves 40, 42 each include an outer body 60, 62 and a pair of suspended tube seats, with tube seats 64, 66 shown in first retainer insert half 40 and tube seats 68 and 70 shown in second retainer insert half 42. In the exemplary embodiment shown, tube seats 64 and 70 cooperate to receive and surround a first fuel line (not shown) and tube seats 66, 68 cooperate to receive and surround a second fuel line (not shown). Accordingly, clip 10 can hold two lengths of fuel line; however, it should be understood that the present invention can be used on clips intended to hold a single fuel line or more than two fuel lines as well as brake lines, tubes and/or conduits of other types and for other purposes.

Tube seats 64, 66, 68, 70 are connected to the respective outer bodies 60, 62 by pluralities of flexible connectors 80, 82, 84, 86 respectively. In the exemplary embodiment shown, three connectors are provided between each tube seat and the outer body to which the tube seat is connected. Accordingly, three connectors 80 connected tube seat 64 to outer body 60 and three connectors 82 connect tube seat 66 also to outer body 60. Three connectors 84 and three connectors 86 connect tube seats 68 and 70, respectively, to outer body 62. It should be understood that more connectors or fewer connectors can be used, depending on the desired robustness or flexibility for the tube seats relative to the retainer outer bodies and/or clip. Material selection also can be used to achieve the desired characteristics. Further, connectors 80, 82, 84, 86 can be provided the full depth of the space between opposite sides of the tube seat and retainer outer body, as shown in the exemplary embodiment; or connectors can be provided in some dimension less than the full depth dimension, to further vary the desired characteristics of robustness and flexibility. Still further, the distance between the tube seats 64, 66, 68, 70 and retainer outer bodies 60, 62 can be altered to achieve desired connector heights to provide desired flexibility in connection with material selection, connector frequency and positioning and connector size including width as well as height and depth.

In some applications and uses for clips, it may be desirable to provide a high degree of flexibility but limit the maximum deflection that can occur. Accordingly, bumpers 90, 92, 94, 96 can be provided in different sizes and frequencies between adjacent connectors 80, 82, 84, 86 projecting into the space between the retainer outer bodies 60, 62 and tube seats 64, 66, 68 and 70. Bumpers 90, 92, 94, 96 limit the maximum deflection of tube seats 64, 66, 68, 70 and serve as shock absorbers to movement if contacted by a tube seat. Further, if tube seats 64, 66, 68, 70 were deflected toward and against retainer bodies 60, 62; large areas of contact could be created. Large areas of contact allow greater transfer of vibrations from tubes in tube seats 64, 66, 68, 70 through the outer bodies 60, 62 and then to the structure to which clip 10 is connected. Bumpers 90, 92, 94, 96 limit the area of contact, and thereby limit the transfer of vibrations. In the exemplary embodiment shown, bumpers 90, 92, 94, 96 are contiguous with outer bodies 60, 62 and project toward tube seats 64, 66, 68 and 70, respectively. It should be understood, however, that to meet stiffness and flexibility characteristics desired, bumpers can be contiguous with the tube seats and project therefrom toward the outer bodies. The bumpers can project through substantially the entire void between the outer bodies and tube seats or can project some minimal distance across the open space. The remaining void between the distal end of the bumpers and the confronting surface of the tube seats or outer bodies determines the amount of deflection permitted before the bumpers provide backing against further deflection.

Multiple layers of isolation are provided for a tube, fluid line or the like held in clip 10 from transfer of vibration and other movements to the structure to which clip 10 is connected. A first level of isolation is provided at the interface of the softer, more flexible material of first retainer insert half 40 and second retainer insert half 42 held in the more rigid material of first and second shells 16, 18. Further isolation is provided by the suspended relationship of tube seats 64, 66, 68, 70 in outer bodies 60, 62. Flexible connectors 80, 82, 84, 86 provide further isolation of tube seats 64, 66, 68, 70 from transferring vibration and movement to clamp 12. Bumpers 90, 92, 94, 96 can limit the maximum deflection of tube seat 64, 66, 68, 70. The clamshell design allows clip 10 to be clamped around tubes or the like by relative rotation between first shell 16 and second shuttle 18 about hinge 20. Locking features 22, 24 hold shells 16, 18 securely closed with a first pipe, tube, conduit or the like secured within an opening 100 defined between first tube seat 64 and fourth tube seat 70 and a second pipe, tube, conduit or the like secured within an opening 102 defined between second tube seat 66 and third tube seat 68.

While described herein as separate parts assembled together after individual formation, it should be understood that tube retainer 14 also can be overmolded directly on to clamp 12, to be held on clamp 12. After molding first shell 16 and/or second shell 18, first retainer insert half 40 can be overmolded on to first shell 16 and second retainer insert half 42 can be overmolded on to second shell 18. Overmolding processes suitable to form first retainer insert half 40 on first shell 16 and second retainer insert half 42 on second shell 18 are well-known in the plastics molding industry.

Further, it should be understood that that the basic concepts for tube isolation described herein can be achieved with constructions different from those of the exemplary embodiment shown. Other geometries can be used for securing a tube retainer in a clamp or other main body portion, and other geometries can be used for retaining a tube or fluid line in the retainer. The fully encircling embodiment shown is merely exemplary. The clamp need not be fully encircling of the retainer, so long as the retainer is held securely, including by structure or by overmolding. The retainer need not be fully encircling of the tube, conduit or other held item, so long as the tube, conduit or other held item is held securely.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An isolating clip comprising:
   a rigid outer clamp connectable to an assembly;
   an insert on the clamp, the insert being of softer material than the clamp;
   said insert including an outer body, a tube seat spaced from said outer body and at least one discrete, substantially straight flexible connector between said outer body and said tube seat, said tube seat having a first end, a second end, a continuous surface extending from said first end to said second end and an opening extending across said tube seat from said first end to said second end, said opening configured to receive an article, said opening defining a dimension that is greater than any other dimension across said tube seat; and
   at least one bumper spanning some of the distance between said outer body and said tube seat and being connected to only one of said outer body and said tube seat;
   wherein said insert and the clamp are arranged such that when the article is received through the opening of said tube seat, the article does not engage the rigid outer clamp.

2. The clip of claim 1, further including a plurality of said discrete flexible connectors between said outer body and said tube seat.

3. An isolating clip comprising:
   a rigid outer clamp connectable to an assembly;
   an insert on the clamp, the insert being of softer material than the clamp;
   said insert including an outer body, a tube seat spaced from said outer body and a plurality of discrete, substantially straight flexible connectors between said outer body and said tube seat, said tube seat having a first end, a second end, a continuous surface extending from said first end to said second end and an opening extending across said tube seat from said first end to said second end, said opening configured to receive an article, said opening defining a dimension that is greater than any other dimension across said tube seat; and
   at least one bumper between adjacent flexible connectors, said at least one bumper spanning some of the distance between said outer body and said tube seat and being connected to only one of said outer body and said tube seat;
   wherein said insert and the clamp are arranged such that when the article is received through the opening of said tube seat, the article does not engage the rigid outer clamp.

4. The clip of claim 3, said rigid outer clamp and said insert having cooperative physical structures allowing said insert to be placed in said rigid outer clamp in only one orientation.

5. The clip of claim 4, said cooperative physical structures including complementary protrusions and cutouts.

6. The clip of claim 1, said rigid outer clamp and said insert having cooperative physical structures allowing said insert to be placed in said rigid outer clamp in only one orientation.

7. The clip of claim 1, said rigid outer clamp including a first shell, a second shell and a hinge connecting said first and second shells.

8. The clip of claim 7, said insert including a first insert half held in said first shell and a second insert half held in said second shell.

9. The clip of claim 8, each of said first insert half and said second insert half having an outer body and a tube seat connected by flexible connectors.

10. The clip of claim 9, including bumpers between adjacent connectors, said bumpers projecting from said outer bodies toward said tube seats and being spaced from said tube seats.

11. The clip of claim 9, each of said first insert half and said second insert half having two tube seats and an outer body connected by flexible connectors.

12. The clip of claim 11, including bumpers projecting from said outer bodies toward said tube seats between adjacent flexible connectors.

13. The clip of claim 11, said outer bodies and said tube seats having a depth dimension between opposite sides, and said flexible connectors extending said depth dimension.

14. The clip of claim 13, including bumpers projecting from said outer bodies toward said tube seats between adjacent flexible connectors.

15. An isolating clip, comprising:
    a rigid outer clamp connectable to an assembly;
    an insert of softer material on the clamp, the insert including an outer body connected to the outer clamp and a tube seat suspended from the outer body by a plurality of discrete, substantially straight flexible connectors, said tube seat having a first end, a second end, a continuous surface extending from said first end to said second end and an opening extending across said tube seat from said first end to said second end, said opening configured to receive an article, said opening defining a dimension that is greater than any other dimension across said tube seat; and said insert and said clamp having poka-yoke structural features limiting assembly to only a single orientation and inhibiting insert dislodgement from the completed clip assembly;

wherein said insert and the clamp are arranged such that when the article is received through the opening of said tube seat, the article does not engage the rigid outer clamp.

16. The clip of claim 15, said insert having protrusions and said outer clamp having cutouts configured for receiving said protrusions.

17. An isolating clip, comprising:
a rigid outer clamp having a first shell and a second shell connectable to one another;
an insert of material softer than said rigid outer clamp, said insert being held in said outer clamp and including a first retainer insert half held in said first shell and a second retainer insert half held in said second shell;
said first retainer insert half including a first outer body connected to said first shell, a tube seat suspended from said first outer body by a plurality of discrete, substantially straight flexible connectors, said tube seat having a first end, a second end, a continuous surface extending from said first end to said second end and an opening extending across said tube seat from said first end to said second end, said opening configured to receive an article, said opening defining a dimension that is greater than any other dimension across said tube seat, and at least one bumper spanning some but less than all of the space defined between said first outer body and said tube seat suspended from said first outer body; and said second retainer insert half including a second outer body connected to said second shell, a tube seat suspended from said second outer body by a plurality of discrete, substantially straight flexible connectors, said tube seat having a first end, a second end, a continuous surface extending from said first end to said second end and an opening extending across said tube seat from said first end to said second end, said opening configured to receive an article, said opening defining a dimension that is greater than any other dimension across said tube seat, and at least one bumper spanning some but less than all of the space defined between said second outer body and said tube seat suspended from said second outer body;

wherein said insert and the clamp are arranged such that when each article is received through the associated opening of said tube seat, the article does not engage the rigid outer clamp.

18. The isolating clip of claim 17, each said first retainer insert half and said second retainer insert half including two tube seats suspended from said outer bodies thereof.

19. The isolating clip of claim 18, including a hinge connecting said first and second shells to each other, and cooperating locking features on said first and second shells for securing said shells to each other.

20. The isolating clip of claim 17, said outer bodies and said tube seats having a depth dimension between opposite sides, and said flexible connectors extending said depth dimension.

\* \* \* \* \*